US010926681B2

(12) United States Patent
Yu

(10) Patent No.: US 10,926,681 B2
(45) Date of Patent: Feb. 23, 2021

(54) BACKBOARD FASTENING DEVICE FOR VEHICLE SEATS

(71) Applicant: HYUNDAI TRANSYS INC., Seosan-si (KR)

(72) Inventor: Ju Yeong Yu, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 0 days.

(21) Appl. No.: 16/682,137

(22) Filed: Nov. 13, 2019

(65) Prior Publication Data

US 2020/0156519 A1    May 21, 2020

(30) Foreign Application Priority Data

Nov. 16, 2018   (KR) .......................... 10-2018-0141402

(51) Int. Cl.
   *B60N 2/60*         (2006.01)
   *F16B 2/22*         (2006.01)

(52) U.S. Cl.
   CPC .............. *B60N 2/6027* (2013.01); *F16B 2/22* (2013.01)

(58) Field of Classification Search
   CPC .............................. B60N 2/6027; F16B 2/22
   See application file for complete search history.

(56) References Cited

U.S. PATENT DOCUMENTS

| 6,074,150 | A  | * | 6/2000  | Shinozaki | ........... B60R 13/0206 24/297 |
| 8,814,268 | B2 | * | 8/2014  | Mineta    | ................ B60N 2/5825 297/228.13 |
| 9,488,202 | B2 | * | 11/2016 | Komeno    | ............... F16B 5/0621 |
| 10,227,025| B2 | * | 3/2019  | Tamai     | ................. B60N 2/6009 |

FOREIGN PATENT DOCUMENTS

| JP | 12002-142915 A |   | 5/2002  |
| JP | 2011037396 A   | * | 2/2011  |
| JP | 2017-196937 A  |   | 11/2017 |

OTHER PUBLICATIONS

Korean Office Action dated Jan. 9, 2020; Appln. No. 10-2018-0141402.

* cited by examiner

*Primary Examiner* — Anthony D Barfield

(57) ABSTRACT

A backboard fastening device for vehicle seats capable of preventing the movement of a backboard attached to the rear surface of a seat and the generation of rattle noise due to the movement of the backboard includes a clip framework and a compressible and elastically restorable fastening clip. The clip framework is formed at a clip mounting end of the backboard. A fastening clip, which is configured to exhibit elastic restoring force when compressed, is mounted to the clip framework, thereby improving assembly durability of the backboard to a seat back, easily restraining the generation of assembly tolerance and rattle noise, and easily achieving separation of the backboard for maintenance.

5 Claims, 5 Drawing Sheets

BACKBOARD FASTENING DEVICE FOR VEHICLE SEATS

CROSS-REFERENCE TO RELATED APPLICATION

This application claims, under 35 U.S.C. § 119(a), the benefit of priority to Korean Patent Application No. 10-2018-0141402 filed on Nov. 16, 2018, the entire contents of which are incorporated herein by reference.

BACKGROUND

(a) Technical Field

The present disclosure relates to a backboard fastening device for vehicle seats, and more particularly to a backboard fastening device for vehicle seats capable of preventing movement of a backboard attached to the rear surface of a seat and generation of rattle noise due to movement of the backboard.

(b) Background Art

In general, a vehicle seat includes a seat cushion for sitting, a seat back for supporting a passenger's back, and a headrest for supporting the passenger's neck and head. A seat adjustment device and various convenience devices are installed inside and outside the seat.

Referring to FIG. 1, a backboard 20 for covering various parts (e.g. a seat back frame, an air cell, and lumber support) installed in the seat back is mounted to the rear surface of the seat back 10.

The backboard 20 is shaped to be concave toward the front of a vehicle body (to have a forwardly curved shape) in which the vehicle seat is installed in order to secure leg room space for a passenger behind the seat. In addition, a map pocket or a table may be attached to the backboard 20.

The backboard should be securely mounted to the rear surface of the seat back without vibration or rattle noise.

FIGS. 2 and 3 are sectional perspective views showing a conventional backboard mounting structure, wherein reference numeral 20 indicates a backboard.

A clip mounting end 21 for mounting a steel clip 30 is integrally formed at the inner surface of the backboard 20, and a push-in protrusion 22 for fastening with the steel clip 30 is formed at the surface of the clip mounting end 21 so as to protrude therefrom.

In particular, the steel clip 30 is formed by bending a band-shaped steel sheet in the shape of an arrow, and is configured such that the front part thereof is formed as a triangular insertion member 31, a locking recess 32 is formed at the middle part thereof, and a fixing plate 33, which is pushed and mounted in the clip mounting end 21, is vertically disposed at the rear part thereof. These elements of the steel clip are integrally formed.

When the fixing plate 33 of the steel clip 30 is pushed through the push-in protrusion 22 formed at the clip mounting end 21 of the backboard 20, the steel clip 30 is fixed and mounted to the clip mounting end 21.

A fastening hole 14 is formed through a predetermined position of a seat back frame 12 disposed in the seat back 10 such that the steel clip 30 can be inserted and fastened into the fastening hole.

Consequently, when the backboard 20 is brought into tight contact with the rear surface of the seat back 10, and at the same time the steel clip 30, which is fixed and mounted to the clip mounting end 21 of the backboard 20, is inserted and fastened within the fastening hole 14 of the seat back frame 12, the backboard 20 is mounted to the seat back 10.

That is, when the insertion member 31 of the steel clip 30 is inserted into the fastening hole 14 of the seat back frame 12, and at the same time the inner circumferential end of the fastening hole 14 is inserted and locked into the locking recess 32, assembly of the backboard 20 to the rear surface of the seat back 10 is accomplished.

However, since both the steel clip 30 and the seat back frame 12 are made of steel, a gap is formed therebetween, whereby the force of fastening therebetween is low. Furthermore, the steel clip and the seat back frame collide with each other due to vibration, whereby a rattle noise is generated.

As shown in FIGS. 2 and 3, therefore, a bush 16 made of a material (e.g. plastic) that is different from steel is formed at the inner circumferential end of the fastening hole 14 of the seat back frame 12 by injection molding such that, when the steel clip 30 is inserted and fastened into the fastening hole 14, the bush directly contacts the surface of the locking recess 32 of the steel clip 30, whereby it is possible to remove the gap therebetween. In addition, since the steel (the steel clip) and the plastic (the bush) contact each other, it is possible to prevent the generation of rattle noise.

Meanwhile, the fixing plate 33 of the steel clip 30 is fixed to the clip mounting end 21 of the backboard 20. The fixing plate 33 of the steel clip 30, which is one end of the steel clip 30, is attached to the clip mounting end 21 in the form of a cantilever. This attachment also causes vibration due to the movement of the backboard caused by the vibration of the vehicle, whereby assembly dimensions are changed and rattle noise is generated.

In order to solve this problem, as shown in FIG. 3, non-woven fabric 35 is further attached to the outer surface of the steel clip 30, whereby it is possible to remove assembly tolerance and to prevent the generation of rattle noise.

Nevertheless, when the backboard is assembled to the rear surface of the seat back, as described above, or when the backboard is separated from the seat back in order to repair the parts disposed in the seat back, an assembly or separation load is concentrated on the interconnection between the steel clip 30 and the clip mounting end 21, whereby the steel clip 30 may be completely separated from the clip mounting end 21, or a portion of the clip mounting end 21 of the backboard 20 may be damaged. As a result, it is not possible to reassemble the backboard to the rear surface of the seat back, and therefore it is necessary to replace the backboard with a new one. Consequently, problems related to expense and maintenance occur.

The above information disclosed in this Background section is provided only for enhancement of understanding of the background of the invention, and therefore, this Background may contain information that does not form the prior art that is already known to a person of ordinary skill in the art.

SUMMARY OF THE DISCLOSURE

Certain embodiments of the present disclosure solve the above-described problems.

In an aspect of the present disclosure, a backboard fastening device for vehicle seats is configured such that a clip framework is integrally formed at a clip mounting end of a backboard and such that a fastening clip, which is configured to exhibit elastic restoring force when compressed, is mounted to the clip framework, thereby improving assembly durability of the backboard to a seat back, easily restraining the generation of assembly tolerance and rattle noise, and easily achieving separation of the backboard for maintenance.

The effects/objects of the present disclosure are not limited to those described above. The objects of the present disclosure will be clearly understood from the following description and could be implemented by means defined in the claims and a combination thereof.

One aspect of the present disclosure provides a backboard fastening device for vehicle seats, the backboard fastening device being configured such that a clip framework is integrally formed at a clip mounting end of a backboard mounted to the rear surface of a seat back, a compressible and elastically restorable fastening clip is mounted to the outer surface of the clip framework, and the clip framework and the fastening clip are inserted and locked into a fastening hole formed in a seat back frame.

A reception recess, into which the upper end of the fastening clip is inserted when compressed, may be formed in the upper surface of the clip framework, and a fixing recess, into which the lower end of the fastening clip is fastened and fixed, may be formed in the lower surface of the clip framework.

The upper end of the fastening clip may be formed as a compressible and elastically restorable elastic compression end, and a locking recess, into which the inner circumferential end of the fastening hole is inserted and locked, may be formed in the upper surface of the rear end of the elastic compression end.

A fixing end, which is inserted and fixed into the fixing recess, may be formed at the lower end of the fastening clip so as to be bent upwards.

A guide protrusion for guiding the insertion direction of a backboard separation tool toward a locking recess of the fastening clip may be further formed at the upper end of the front part of the clip mounting end.

The fastening clip may be formed by injection-molding polyoxymethylene (POM) containing an oil ingredient.

Other aspects and embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
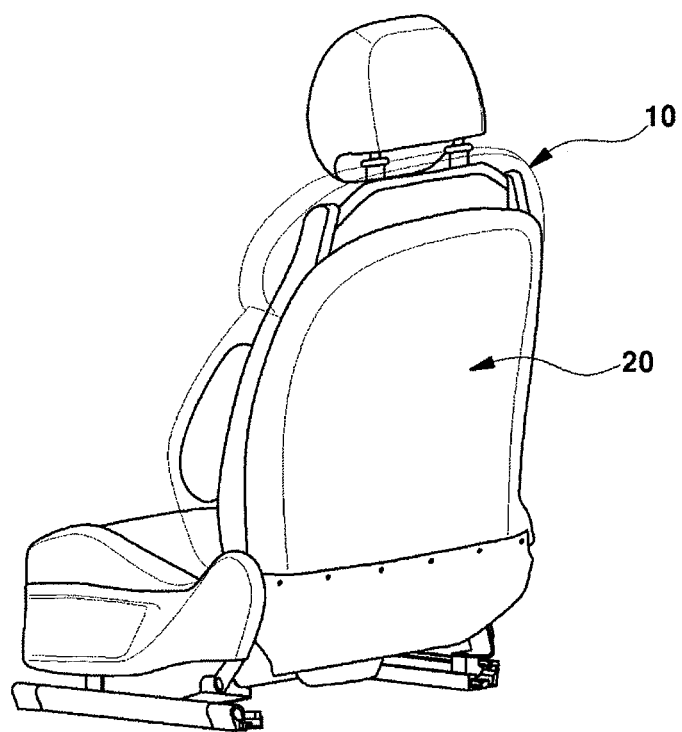
FIG. 1 is an illustrative view showing the state in which a backboard is mounted to the rear surface of a vehicle seat.
Figure 2:
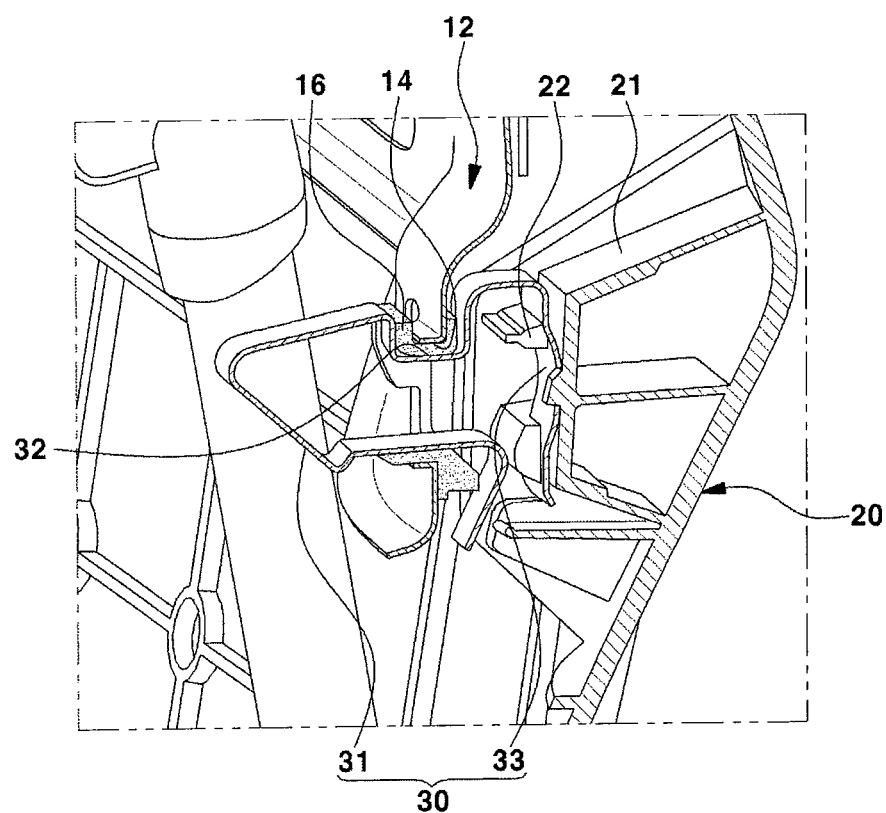
FIGS. 2 and 3 are sectional perspective views showing a conventional backboard mounting structure.
Figure 3:
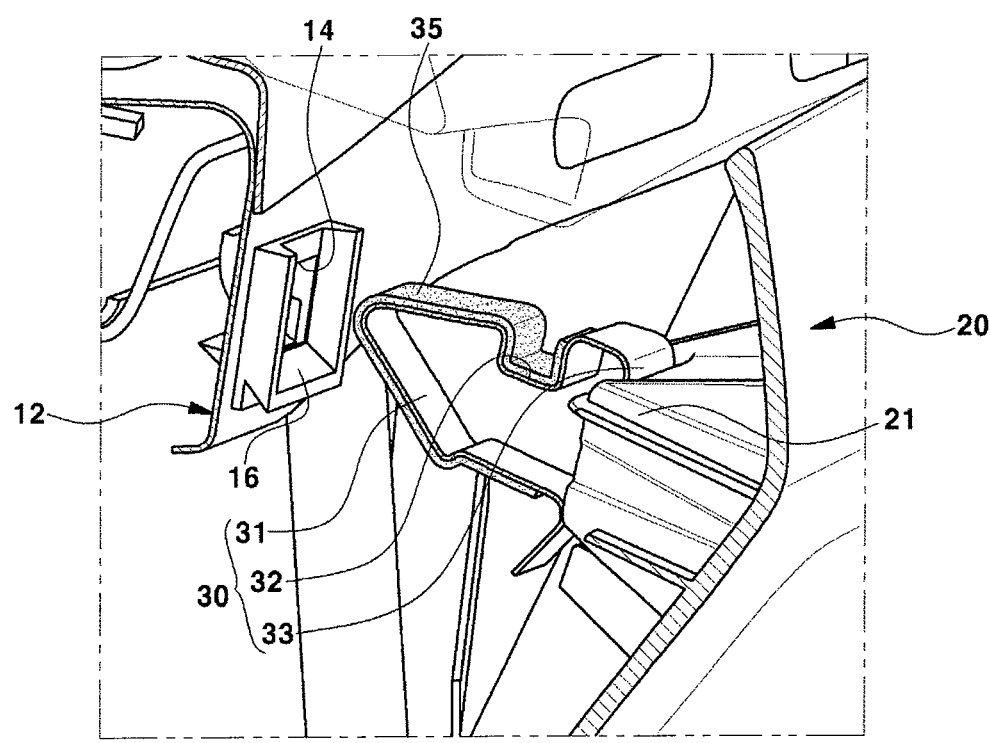
Figure 4:
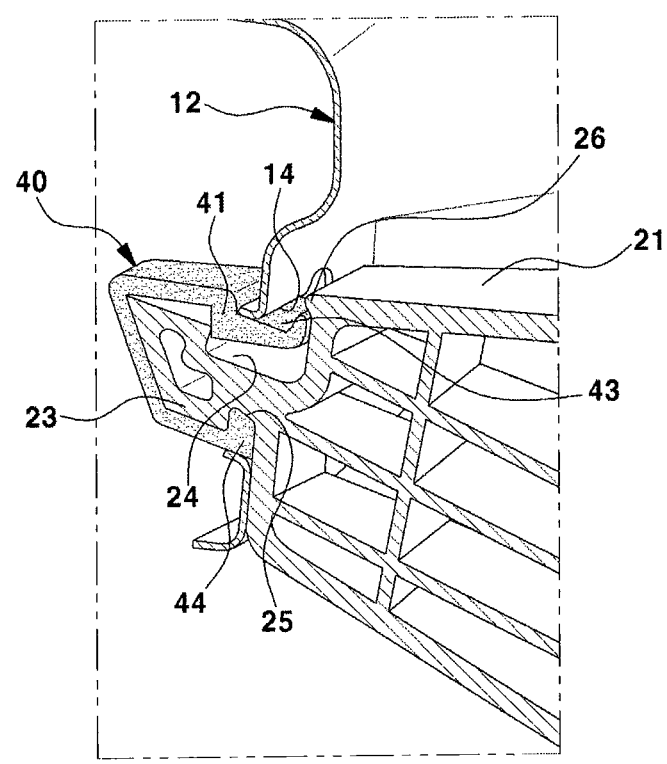
FIG. 4 is a perspective view showing a backboard fastening device for vehicle seats according to an aspect of the present disclosure.
Figure 5:
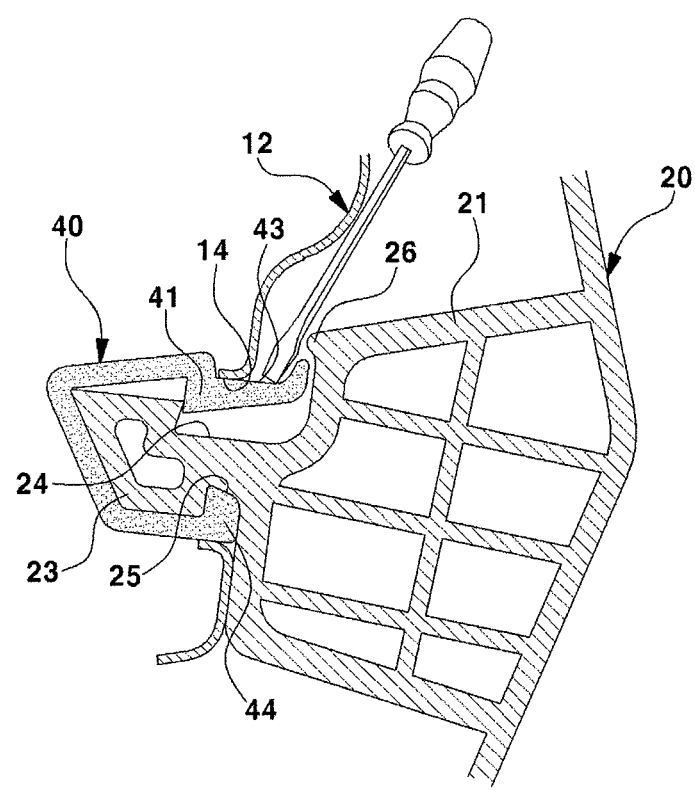
FIG. 5 is a sectional view showing the state in which a backboard is jointed using the backboard fastening device according to an aspect of the present disclosure.

It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present disclosure, examples of which are illustrated in the accompanying drawings and described below. However, the present disclosure may be embodied in many different forms and should not be construed as limited to the embodiments set forth herein. Rather, these embodiments are provided so that this disclosure will be thorough and complete, and will fully convey the scope of the disclosure to those skilled in the art.

In addition, the term "unit" or "assembly" used herein signifies one unit that processes at least one function or operation, and may be realized by hardware, software, or a combination thereof.

In addition, relational terms, such as "first" and "second," are used in this specification only to distinguish between the same elements, and the elements are not limited as to the sequence therebetween in the following description.

As previously described with reference to FIG. 1, a backboard 20 is mounted to the rear surface of a seat back 10 (e.g. a front seat) for vehicles in order to cover various parts installed in the seat back 10 and to secure leg room space for a passenger behind the seat.

In order to fasten the backboard 20 to a seat back frame in the seat back, a clip mounting end 21 is formed at the inner surface of the backboard 20.

According to an aspect of the present disclosure, a clip framework 23 is integrally formed at the front surface of the clip mounting end 21 so as to protrude therefrom. As will be described below, the clip framework 23 serves as a structure to which a fastening clip 40 is attached so as to be compressed and elastically restored and as a reinforcement structure for improving durability of the fastening clip 40.

To this end, the clip framework 23 is configured to have a structure in which a reception recess 24 is formed in the upper surface thereof so as to be concave downwards such that the upper end of the fastening clip 40 is inserted into the reception recess so as to be elastically restored when compressed and in which a fixing recess 25 is formed in the lower surface thereof so as to be concave upwards such that the lower end of the fastening clip 40 is inserted, fastened, and fixed into the fixing recess.

In particular, the fastening clip 40 is disposed on the outer surface of the clip framework 23, and the fastening clip 40 can be compressed so that it fits within the reception recess and then elastically restored after being compressed.

More specifically, the fastening clip 40 is configured to tightly contact the front surface and the lower surface of the clip framework 23, among the outer surfaces of the clip framework 23, and at the same time is spaced apart from the upper surface of the clip framework 23 so as to be compressible.

To this end, the upper end of the fastening clip 40 is formed as an elastic compression end 41 configured to be compressed and elastically restored. A locking recess 43, into which the inner circumferential end of a fastening hole 14 formed in a seat back frame 12 is inserted and locked, is formed in the upper surface of the rear end of the elastic compression end 41. In addition, a fixing end 44, which is inserted, fastened, and fixed into the fixing recess 25 of the clip framework 23, is formed at the lower end of the fastening clip 40 so as to be bent upwards.

When the front end and the lower end of the fastening clip 40 are brought into tight contact with the front surface and the lower surface of the clip framework 23, respectively, and at the same time the fixing end 44 of the fastening clip 40 is pushed, fastened, and fixed into the fixing recess 25 of the clip framework 23, the elastic compression end 41 of the fastening clip 40 is spaced apart from the upper surface of the clip framework 23 so as to be compressible.

Consequently, the backboard 20 is brought into tight contact with the rear surface of the seat back 10, and at the same time the clip framework 23 of the backboard and the fastening clip 40 are inserted and fastened into the fastening hole 14 of the seat back frame 12.

As the clip framework 23 and the fastening clip 40 are inserted into the fastening hole 14, the elastic compression end 41 of the fastening clip 40 compresses downwards by force of the inner circumferential end of the fastening hole 14 against the elastic compression end, and the fastening clip 40 is thus received in the reception recess 24 of the clip framework 23, whereby the clip framework 23 and the fastening clip 40 easily pass through the fastening hole 14. After passing, the elastic compression end 41 of the fastening clip 40 returns upwards due to the elastic restoring force thereof. As a result, the inner circumferential end of the fastening hole 14 is inserted and locked into the locking recess 43 formed in the upper surface of the elastic compression end 41, whereby assembly of the backboard to the seat back is accomplished.

Since the clip framework 23 is disposed in the fastening clip 40 while serving as a frame, as described above, durability of the fastening clip may be improved. In particular, since assembly of the backboard 20 is achieved in the state in which only the elastic compression end 41 of the fastening clip 40 is compressed, it is possible to minimize the generation of assembly tolerance and gap, whereby it is possible to prevent the generation of rattle noise due to driving vibration.

Conventionally, both the steel clip 30, which is attached to the clip mounting end 21 of the backboard 20, and the seat back frame 12, to which the steel clip 30 is fastened, are made of steel. Thus, when the steel clip and the seat back frame collide with each other due to driving vibration, a metallic rattle noise is generated. In order to solve these problems, the fastening clip 40 in an aspect of the present disclosure is formed by injection molding a material different from the material of the seat back frame, which is steel, e.g. polyoxymethylene (POM) containing an oil ingredient, whereby it is possible to prevent the generation of metallic rattle noise when the fastening clip contacts the seat back frame.

Meanwhile, the backboard 20 may be separated from the seat back 10 in order to perform maintenance on parts (e.g. an electric motor, an air cell, and a lumber support) disposed in the seat back. Therefore, it is preferable for a maintenance engineer to easily separate the backboard from the seat back.

To this end, a guide protrusion 26 for guiding the insertion direction of a tool used to separate the backboard toward the locking recess 43 formed in the elastic compression end 41 of the fastening clip 40 is further formed at the upper end of the front part of the clip mounting end 21 of the backboard 20.

When one desires to separate the backboard 20 for maintenance purposes after the backboard 20 is assembled to the rear surface of the seat back 10, the tool may be inserted between the clip mounting end 21 and the seat back frame 12 in the state of being in tight contact with the guide protrusion 26, whereby the tool may be accurately inserted into the locking recess 43 formed in the elastic compression end 41 of the fastening clip 40 according to the directional guide of the guide protrusion 26. Subsequently the tool may naturally push the elastic compression end 41 of the fastening clip. As a result, the fastening clip 40 may be easily separated from the fastening hole 14 of the seat back frame 12, whereby the backboard may be easily separated from the seat back.

As is apparent from the foregoing, aspects of the present disclosure may have the following effects.

In one aspect of the present disclosure, a clip framework is integrally formed at a clip mounting end of a backboard, a fastening clip, which is configured to exhibit elastic restoring force when compressed, is mounted to the outer surface of the clip framework, and the clip framework and the fastening clip are inserted and fastened into a fastening hole formed in a seat back frame, whereby it is possible to easily achieve the assembly of the backboard to a seat back.

In another aspect of the present disclosure, the clip framework is disposed in the fastening clip, whereby it is possible to improve durability of the fastening clip, to minimize the movement of the fastening clip, and to prevent the generation of rattle noise due to the movement of the fastening clip.

In another aspect of the present disclosure, an injected bush made of a different material, which is assembled to the fastening hole of the seat back frame in order to prevent the generation of rattle noise due to the movement of the fastening clip, and non-woven fabric, which is attached to the surface of the fastening clip, may be excluded, unlike the conventional art, whereby it is possible to reduce the number of parts to be assembled and to reduce cost related thereto.

In another aspect of the present disclosure, the entry of a separation tool is smoothly guided when the backboard is separated in order to maintain the interior of the seat back, whereby it is possible to easily separate the backboard.

The effects of the present disclosure are not limited to those mentioned above. It should be understood that the effects of the present technology include all effects that can be inferred from the foregoing description of the present technology.

The above detailed description illustrates the present invention. In addition, the foregoing describes exemplary embodiments of the present disclosure. The present technology may be used in various different combinations, changes, and environments. That is, variations or modifications can be made within the conceptual scope of the present disclosure, equivalents to the disclosure of the present technology, and/or the scope of technology and knowledge in the art to which the present invention pertains. The embodiments describe the best mode for realizing the technical concept of the present technology, and variations required for the concrete application and use of the present technology are possible. Therefore, the above detailed description does not limit the present technology disclosed above. In addition, the appended claims should be interpreted to include other embodiments.

What is claimed is:

1. A backboard fastening device for vehicle seats, the backboard fastening device comprising:
 a clip framework formed at a clip mounting end of a backboard for mounting to a rear surface of a seat back;
 a compressible and elastically restorable fastening clip mounted to an outer surface of the clip framework, wherein the clip framework and the fastening clip are configured to be inserted and locked into a fastening hole formed in a seat back frame,
 wherein the fastening clip comprises an upper end and a lower end, and the clip framework comprises:
 a reception recess formed in an upper surface of the clip framework, the reception recess being configured such that the upper end of the fastening clip is inserted therein when the fastening clip is compressed; and
 a fixing recess formed in a lower surface of the clip framework, the fixing recess being configured such that the lower end of the fastening clip is fastened and fixed within the fixing recess.

2. The backboard fastening device according to claim 1, wherein the upper end of the fastening clip comprises a compressible and elastically restorable elastic compression end, and the elastic compression end comprises a locking recess formed in an upper surface of a rear end of the elastic compression end, wherein the locking recess is configured to receive an inner circumferential end of the fastening hole such that the inner circumferential end is inserted and locked within the locking recess when the backboard is mounted to the seat back frame.

3. The backboard fastening device according to claim 1, wherein the fastening clip comprises a fixing end formed at the lower end of the fastening clip so as to be bent upwards, wherein the fixing end is configured to be inserted and fixed within the fixing recess.

4. The backboard fastening device according to claim 1, wherein the fastening clip is formed by injection-molding polyoxymethylene (POM) containing an oil ingredient.

5. The backboard fastening device for vehicle seats, the backboard fastening device comprising:
 a clip framework formed at a clip mounting end of a backboard for mounting to a rear surface of a seat back;
 a compressible and elastically restorable fastening clip mounted to an outer surface of the clip framework, wherein the clip framework and the fastening clip are configured to be inserted and locked into a fastening hole formed in a seat back frame; and, a guide protrusion for guiding an insertion direction of a backboard separation tool toward a locking recess of the fastening clip, the guide protrusion being formed at an upper end of a front part of the clip mounting end.

* * * * *